Aug. 30, 1960 A. HELLWIG 2,950,536
METHOD AND APPARATUS FOR ANGULAR MEASUREMENT OF PIPE BENDS
Filed Nov. 13, 1956
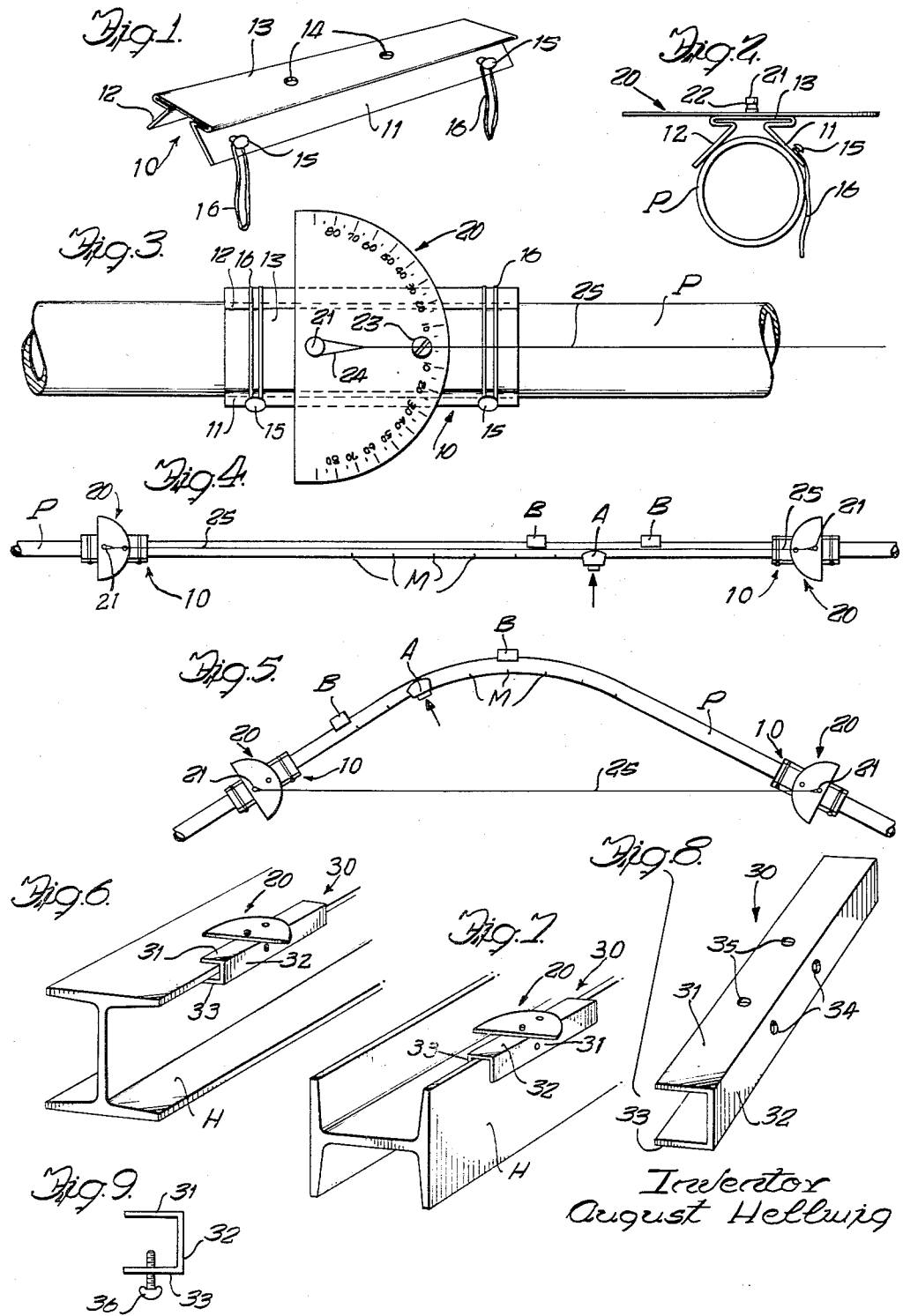
Inventor
August Hellwig United States Patent Office 2,950,536
Patented Aug. 30, 1960

2,950,536

METHOD AND APPARATUS FOR ANGULAR MEASUREMENT OF PIPE BENDS

August Hellwig, 2924 N. Lincoln Ave., Chicago 13, Ill.

Filed Nov. 13, 1956, Ser. No. 621,913

3 Claims. (Cl. 33—86)

This invention relates to a method of and apparatus for determining angular measurements. It is particularly well adapted to the measurement of bends in pipes, tubes, beams, channels, rails and other structural members. In addition, the method is also adaptable to angular measurements in other situations in which a protractor cannot be located at the bisector of an arc or angle.

The present invention is a continuation in part of my co-pending application, Serial No. 490,259 dated Feb. 24, 1955, now abandoned.

With some methods of forming bends in pipes, electrical conduits and the like, it is necessary to measure the angularity as the bending proceeds. Since various members of the bending apparatus preclude the application of a bevel gauge to the pipe, it has heretofore been necessary to remove the pipe repeatedly from the apparatus for measurement. This is both laborious and time consuming. Some attempts have been made to overcome this difficulty, by means which are dependent on the movement of some element of the bending machine, but this has proved to be unsatisfactory, due to errors inherent in such methods.

It is well known that pipes and other metallic blanks have an inherent elasticity, due to which there is always a difference between measurements taken while the pipe is under bending pressure, and subsequent measurements taken when the pipe springs back to stability upon release of such pressure. In order to produce a bend of required angularity, it is necessary to overbend to the extent of the elasticity. If this is not readily and accurately determined, time is wasted either by an overly cautious approach to the required angularity, or by a worse condition of overbending which necessitates unbending. The difficulty of accurate measurement and the determination of elasticity is additionally complicated by the multiplicity of variable factors involved, when using equipment designed to bend pipes to different radii.

Other attempts have been made to resolve this difficulty by means of apparatus for measurement which is more difficult to move about or set up, than the associated bending machine. The utility of such heavy or cumbersome measuring apparatus is limited to such jobs or sites where large numbers of bends are made. However, accuracy of measurement is just as desirable when only one or a few bends are required at a given site. It is therefore an objective of the present invention to provide extremely light, portable apparatus, adaptable to direct and accurate measurement of the angularity of pipe bends.

It is a further objective to provide apparatus directly attachable to the pipe, and independent of any member or element of the bending machine, so that a bend may be measured with equal facility whether the pipe is positioned operatively in the machine, or removed from it.

It is a still further objective to provide apparatus which rides on the pipe, and follows its every movement while bending, as well as when it springs back to stability upon release of the bending pressure, thereby making it possible readily to determine the extent of elasticity at every stage of the bending operation.

Further objectives and advantages of the method and apparatus are disclosed with reference to the drawings, of which:

Figure 1 is a perspective view of a protractor supporting saddle.

Fig. 2 is an end view of the apparatus operatively positioned on a pipe prior to attachment thereto.

Fig. 3 is a plan view of the apparatus operatively attached to a pipe.

Fig. 4 is a diagrammatic view of the apparatus attached to spaced apart portions of a pipe preparatory to bending thereof.

Fig. 5 is a diagrammatic view similar to Fig. 4 showing the apparatus and pipe after bending.

Fig. 6 is a perspective view of an optional protractor supporting member attached to a beam.

Fig. 7 is a perspective view similar to Fig. 6 with the protractor in a different position.

Fig. 8 is a perspective view on a larger scale of the optional protractor supporting member.

Fig. 9 is an end view of the optional protractor supporting member.

Referring now to the drawings, the reference numeral 10 designates generally a protractor supporting saddle, comprising diverging sides 11 and 12, and a central portion 13 which is provided with screw threaded holes 14—14. By means of screws 21 and 23 passing slidably through registering holes therein, a protractor 20 is firmly attached to the saddle 10, being normally left so attached, and handled therewith as a unit. The screw 23 is countersunk into the protractor 20. The screw 21 passes slidably through the radial center of the protractor 20, and is shouldered to provide a peripheral groove 22 whereby to pivotably support a loop 24 formed in each end of an elastic string 25, whose purpose will presently be explained.

To attach the saddle 10 to a pipe P, the saddle is laid on top of the pipe so that the sides 11 and 12 straddle it, and so oriented that the protractor 20 is substantially parallel to the floor or other underlying support surface. Two studs 15—15 are provided near the corners of the side 11, comprising rivets pressed into close fitting holes. Looped or knotted over the studs 15—15 are elastic loops 16—16, which may comprise stout rubber bands. The free ends of the loops 16—16 are passed under the pipe P, and across the side 12 and the central portion 13, whereupon they are slipped over the studs 15—15. Additional frictional engagement between the pipe P and the saddle 10 may be provided by lining the interior surface of the saddle 10 with a thin sheet of rubber (not shown). When attached to the pipe P as described, the saddle 10 is longitudinally in parallel alignment with the axis of the pipe P, and thereby the radial zero reference line of protractor 20 is similarly aligned.

It should be understood that pipe bending machines are proportioned to operate on a limited range of sizes, and the saddle 10 is correspondingly proportioned.

Figure 4 shows a pipe P positioned between elements of a hydraulic bending device, which is no part of the present invention, but illustrates a practical application thereof. Hydraulic pipe benders and the manner of their use are well known. They comprise essentially a forming member A, actuated by a hydraulic jack (not shown) to move in the direction of the arrow, and reaction members B—B. Prior to bending, the pipe P is marked off as indicated at M—M, and small incremental sub-bends are progressively formed, the pipe P being longitudinally advanced between the forming member A and the reaction members B—B.

After the pipe P is positioned in the bending device, two saddles 10—10 each carrying a protractor 20, are attached to the pipe in the manner already described, and with the zero index of the protractors 20—20 oriented one toward the other. The saddles 10—10 may be spaced apart any convenient distance, provided only that they are on opposite sides of the portion M—M of the pipe P which will comprise the bend. When thus attached, the radial zero reference lines of the two protractors 20—20 are in alignment, and mutually parallel to the pipe's axis. Also, they are co-planar with the bend about to be formed.

An elastic string 25, having loops 24—24 at its ends, is attached to the screws 21—21. The string 25 acts as a pointer with reference to the graduations of the protractor's scales, and in its initial position is in alignment with their zero reference lines. As the pipe bends, the protractors 20—20 are carried along on the diverging straight portions of the pipe P, on either side of the bend. The string 25 moves pivotably across the protractors 20—20, indicating thereon the increasing angularity as the pipe P bends. Figure 5 illustrates the position of the apparatus after the pipe P is bent to a considerable extent. The angle of the bend is indicated by the summation of the readings of the two protractors 20—20.

In the pipe-bending art, it is customary to express the angular measurement as the departure from the original straight or 180° angle. Thus, a 10° bend corresponds to one having an included angle of 170°, not customarily referred to. When the included angle is the one of primary interest, protractors with central 90° indexes decreasing on either side to zero, may be substituted for those herein described.

When the bending pressure is released, the bend springs back to a somewhat lesser angle. The saddles 10—10 and the protractors 20—20 mounted thereon, ride back with the pipe P while it adjusts itself to stability. The string 25 meanwhile moves pivotably back a little toward the zero marks of the protractors 20—20, to indicate thereon decreased angles. If these are added, and the summation is subtracted from the earlier summation, the difference indicates the extent of elasticity then present.

When a bend is formed as described by progressively pressing spaced portions of a pipe, by noting the summation of the protractors' readings a workman is enabled to determine at any stage of the bending, both the true or stable angle of the bend, and the extent of overbending required to compensate for elasticity when forming the next incremental sub-bend. There is then no occasion for excessive caution, nor for excessive overbending.

Ordinarily, pipes are bent to form circular arcs. However, there are occasions in architectural and mechanical construction, in which elliptical or other non-circular bends are required. From the foregoing description it should be apparent that the apparatus and method of the present invention are readily adaptable to the measurement of such additional bends. They may be plotted by varying the length of the incremental portions comprising the bend, and indicating the required angularity of each portion, as well as the cumulative angularity at each. Bending may then be easily regulated with reference to the progressive protractor readings.

Thus far, the description has dealt only with the measurement of pipe bends. The method is equally adaptable to the measurement of bends formed in such structural members as beams, angles, channels and the like. This may be understood by referring to Fig. 6, which shows a protractor 20 attached to a beam H, preparatory to measuring a bend to be formed co-planar with the beam's flanges. Similarly, Fig. 7 illustrates how a protractor 20 may be attached to the same beam H, but positioned to measure a bend about to be formed co-planar with the beam's web.

The alternative positioning of the protractors 20 is accomplished by means of an optional embodiment of the protractor supporting member, designated generally by the reference numeral 30, and illustrated in Fig. 8 and Fig. 9. It is a channel comprising sides 31, 32 and 33. The side 33 is provided with a thumb screw 36 whereby the channel 30 may be clamped to a beam or the like. A protractor may be attached to the side 31, by means of screw-threaded holes 35—35 provided therein. The protractor may alternatively be attached to the side 32, by means of the screw-threaded holes 34—34. Thus, when the channel 30 is clamped to a beam H, a protractor 20 may be attached to the channel 30, either as illustrated in Fig. 6, or as illustrated in Fig. 7. With two protractors 20—20 attached to the same edge of a beam, on opposite sides of the portion comprising the bend, the procedure of measuring the bend is identical with that of measuring a pipe bend, as already described.

While a particular embodiment of the invention has been described in detail, and in association with an illustrative bending machine, there is no intention to limit the scope of the invention thereto. Rather, the intention is to include all modifications, equivalents, and alternative embodiments which fall within the spirit and scope of the invention, specification and appended claims.

I claim:

1. In combination, two protractor supporting saddles, each comprising three flat, rectangular strips of equal length, two of which are rigidly attached along their longer edges to the third strip near its lateral center, and the two strips diverging to define between them a substantially V-shaped opening proportioned for the nesting therein of various sized pipes, and the face of the third strip opposite the V-shaped opening having attached thereto a protractor provided at its radial center with a hole, and spaced therefrom and along the protractor's zero reference line, a second hole, both holes registering with screw threaded holes provided in the previously mentioned third strip, and screws passing slidably through the holes in the protractor into threaded engagement with the registering holes in the third strip, the screw at the protractor's radial center being shouldered and provided with a peripheral groove pivotably supporting a loop formed in the end of an elastic string.

2. A method adaptable to the angular measurement of a pipe-bend or similar workpiece during the process of formation and while operatively positioned in the bending machine, said method comprising thte steps of marking off on the unbent pipe a portion substantially equal to the arcuate length of the proposed bend, and at any point outside this marked-off portion, attaching to the pipe a protractor, and at any point on the opposite side of the marked-off portion attaching a second protractor, both protractors being oriented in co-planar relationship to the underlying support surface or to the pre-determined plane of the bend, and with their zero radial reference lines respectively parallel to the axis of the pipe, and attaching a taut string to the radial centers of the protractors, thereby revealing as the bending proceeds, the total angle of the bend, which is the sum of the angles indicated by the string where it crosses the protractors.

3. An angular measuring device for bent work pieces comprising, in combination, a pair of protractor supporting channels, each said channel having a pair of sides and a back, attachment means on each of said channels for the attachment of a protractor thereto, a pair of protractors each secured to a channel by the attachment means, second attachment means on each channel for securing each channel to a bent workpiece at points removed from the bend of the workpiece, both protractors being oriented in co-planar relationship to each other and in a plane parallel to the plane including the axis of the workpiece in the bent section, string attachment means secured at the radial center of each protractor, and a string securable to said radial centers of said protractors in a taut condition when the channels and protractors are secured to the bent workpiece whereby the angle of bend may be readily observed by the user.

References Cited in the file of this patent

UNITED STATES PATENTS

| | | |
|---|---|---|
| 645,653 | White | Mar. 20, 1900 |
| 726,677 | Hagan | Apr. 28, 1903 |
| 790,813 | Auld | May 23, 1905 |
| 1,065,560 | Smith | June 24, 1913 |
| 1,114,374 | Link | Oct. 20, 1914 |
| 1,544,980 | Hartsock | July 7, 1925 |
| 2,403,420 | Willingham | July 2, 1946 |
| 2,502,660 | McLean | Apr. 4, 1950 |
| 2,636,273 | Morris | Apr. 28, 1953 |
| 2,788,584 | Adrien | Apr. 16, 1957 |

FOREIGN PATENTS

| | | |
|---|---|---|
| 128,677 | Germany | July 28, 1901 |
| 20,928 | Great Britain | Sept. 20, 1907 |
| 402,815 | Germany | Sept. 20, 1924 |
| 610,766 | Germany | Mar. 15, 1935 |
| 999,152 | France | Jan. 28, 1952 |
| 484,811 | Canada | July 15, 1952 |